(12) United States Patent
Kumar et al.

(10) Patent No.: US 8,594,612 B2
(45) Date of Patent: Nov. 26, 2013

(54) SYNCHRONIZING WAKEUP OPERATIONS IN ELECTRONIC DEVICES

(75) Inventors: Gaurav Kumar, San Diego, CA (US); Jianqiang He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 948 days.

(21) Appl. No.: 12/253,057

(22) Filed: Oct. 16, 2008

(65) Prior Publication Data
US 2010/0099358 A1    Apr. 22, 2010

(51) Int. Cl.
*H04B 1/06*    (2006.01)
(52) U.S. Cl.
USPC ...................................................... 455/343.2
(58) Field of Classification Search
USPC ...................................................... 455/343.2
See application file for complete search history.

(56) References Cited

U.S. PATENT DOCUMENTS

| | | | |
|---|---|---|---|
| 7,155,264 B2 * | 12/2006 | Twitchell, Jr. ................ | 455/574 |
| 2003/0036354 A1 | 2/2003 | Lee et al. | |
| 2006/0077044 A1 * | 4/2006 | Hughes et al. ............. | 340/10.34 |
| 2008/0056169 A1 | 3/2008 | Pattabiraman et al. | |

FOREIGN PATENT DOCUMENTS

WO    WO2007032105 A1    3/2007

OTHER PUBLICATIONS

Hall E S et al., "RF Rendez-blue: reducing power and inquiry costs in bluetooth-enabled mobile systems" Computer Communications and Networks, 2002. Proceedings. Eleventh International Conference on Oct. 14-16, 2002, Piscataway, NJ, USA, IEEE, Oct. 14, 2002 , pp. 640-645, XP010610952 ISBN: 978-0-7803-7553-6 p. 643, paragraphs IV, V, VI—p. 645.
International Search Report and Written Opinion—PCT/US2009/060890—ISA/EPO—Mar. 25, 2010.

* cited by examiner

*Primary Examiner* — Lincoln Donovan
*Assistant Examiner* — Khareem E Almo
(74) *Attorney, Agent, or Firm* — Kevin Cheatham

(57) ABSTRACT

An electronic device includes a first receiver configured to receive a first wireless signal, and a first timing module configured to wake up the first receiver from a first sleep state and to generate a synchronization signal indicating a wakeup time of the first receiver. The electronic device also includes a second receiver configured to receive a second wireless signal, and a second timing module configured to receive the synchronization signal and to wake up the second receiver from a second sleep state based on the synchronization signal.

56 Claims, 12 Drawing Sheets

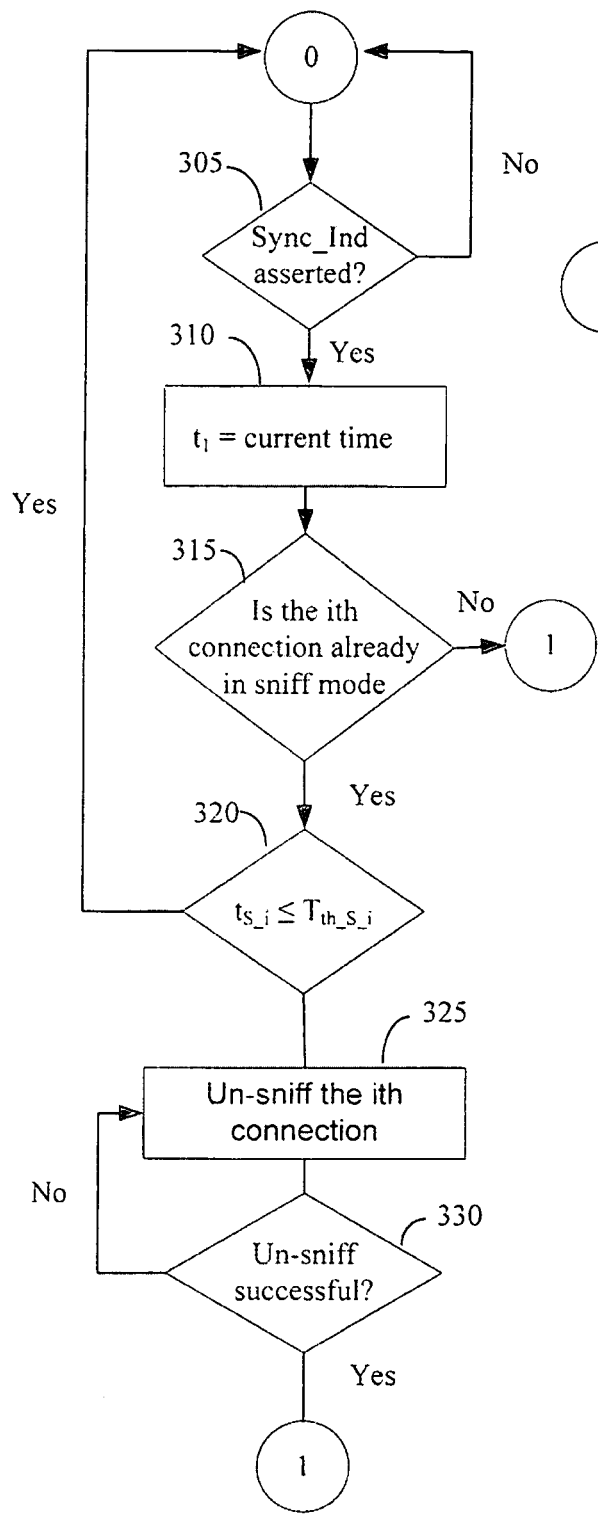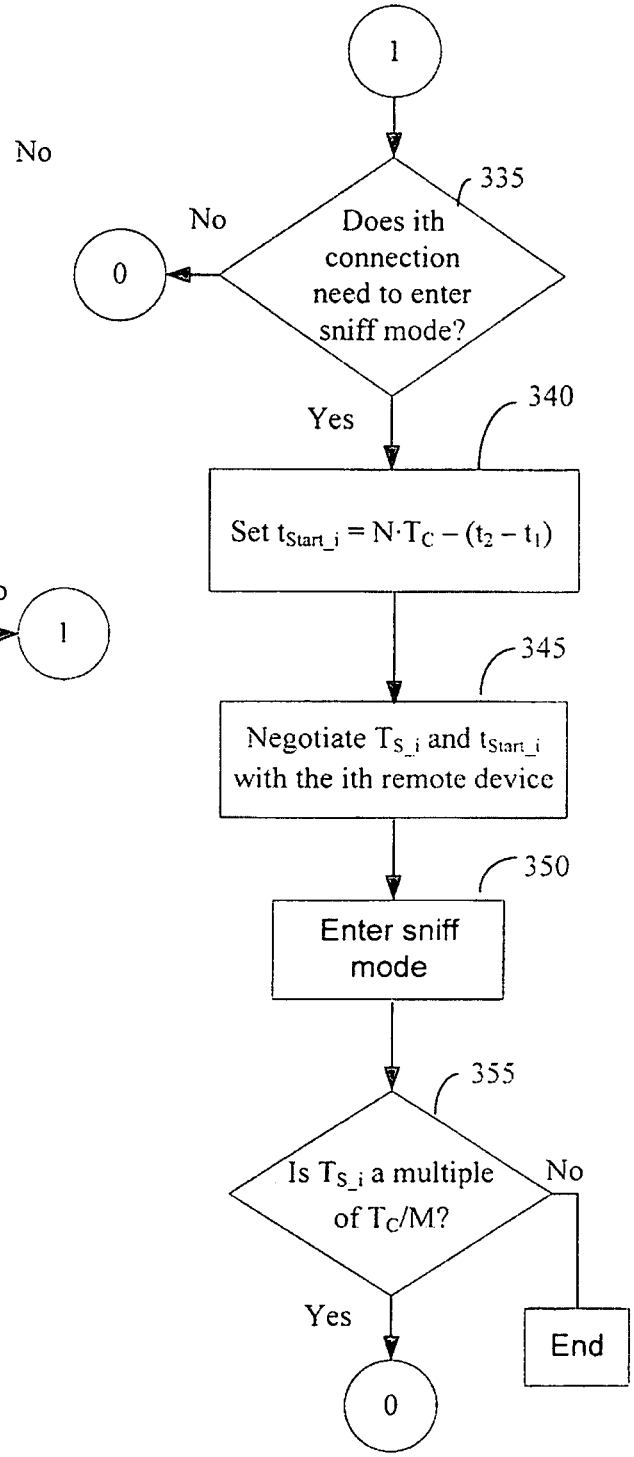
FIG. 8A
FIG. 8B

SYNCHRONIZING WAKEUP OPERATIONS IN ELECTRONIC DEVICES

BACKGROUND

1. Field

The subject technology generally relates to electronic devices, and, more particularly, to methods and apparatuses for synchronizing wakeup operations in electronic devices.

2. Background

Mobile electronic devices may include both a cellular system, e.g., for providing cellular voice and/or data communications, and a Bluetooth system, e.g., for providing wireless communications with other devices such as a wireless headset. When a cellular system and Bluetooth system are integrated in an electronic device, both systems may have their own low-power modes of operation involving periodic wakeups. A problem with this is that the wakeup operations of the cellular system and Bluetooth system are performed in an asynchronous manner to each other. Such asynchronous operations may consume large average power over a period of time, which reduces the standby time of the device.

SUMMARY

In one aspect of the disclosure, an electronic device is provided. The electronic device includes a first receiver configured to receive a first wireless signal, and a first timing module configured to wake up the first receiver from a first sleep state and to generate a synchronization signal indicating a wakeup time of the first receiver. The electronic device also includes a second receiver configured to receive a second wireless signal, and a second timing module configured to receive the synchronization signal and to wake up the second receiver from a second sleep state based on the synchronization signal.

In a further aspect of the disclosure, a method of synchronizing wakeup operations of an electronic device is provided. The method includes waking up a first receiver from a first sleep state to receive a first wireless signal, and generating a synchronization signal indicating a wakeup time of the first receiver. The method further includes waking up a second receiver from a second sleep state based on the synchronization signal to receive a second wireless signal.

In yet a further aspect of the disclosure, a system for synchronizing wakeup operations is provided. The system includes means for waking up a first receiver from a first sleep state to receive a first wireless signal, and a means for generating a synchronization signal indicating a wakeup time of the first receiver. The system further includes means for waking up a second receiver from a second sleep state based on the synchronization signal to receive a second wireless signal.

In yet a further aspect of the disclosure a processing system is provided. The processing system includes an input port and an output port. The processing system further includes a processor configured to receive a synchronization signal indicating a wakeup time of a first receiver, and to wake up a second receiver from a sleep state based on the synchronization signal to receive a wireless signal.

In yet a further aspect of the disclosure, a machine-readable medium comprising instructions executable by a processing system in an electronic device is provided. The instructions include code for receiving a synchronization signal indicating a wakeup time of a first receiver, and code for waking up a second receiver from a sleep state based on the synchronization signal to receive a wireless signal.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 8A and 8B are flow charts illustrating an example of operation of synchronizing sniff activities with cellular wakeups.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
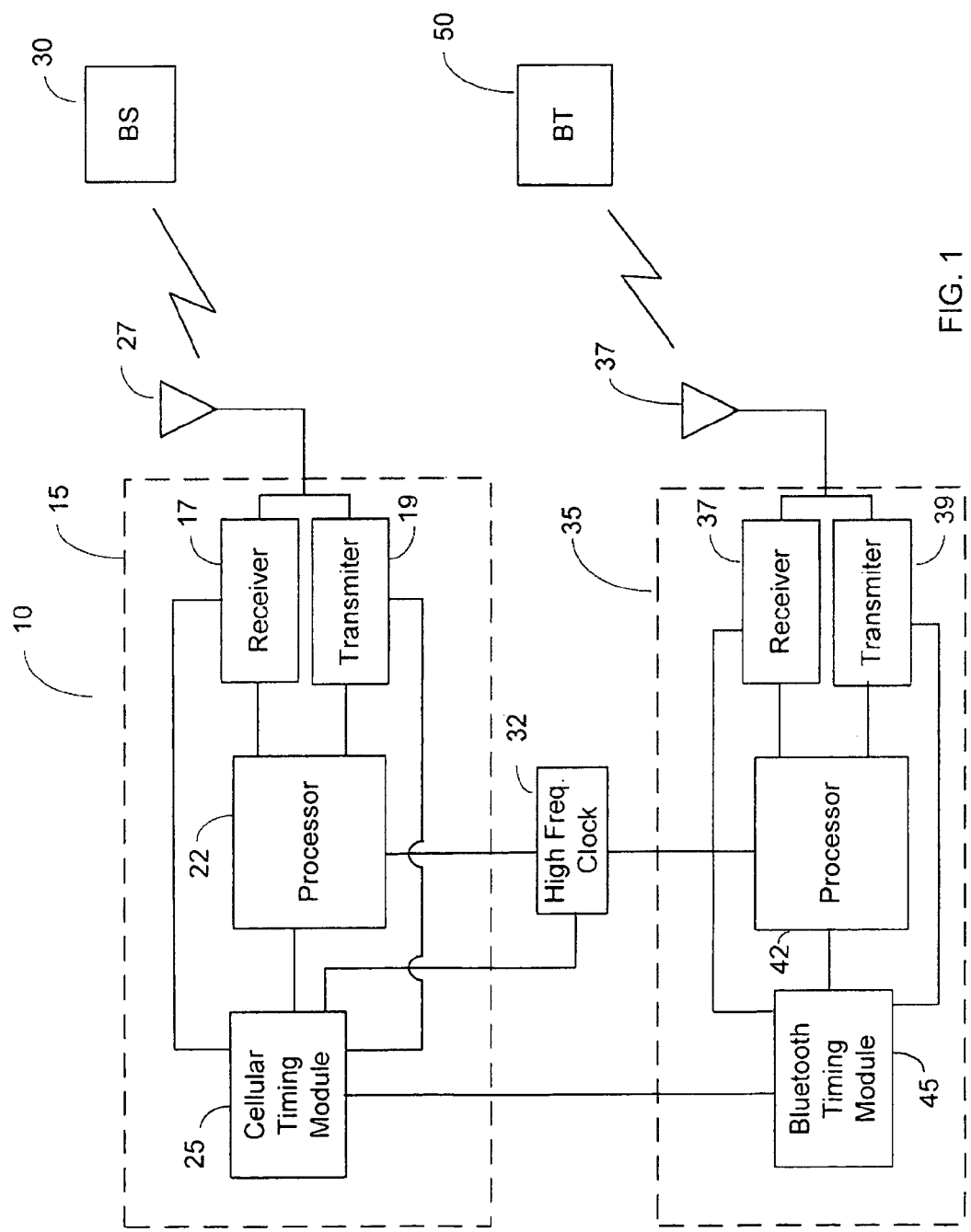
FIG. 1 is a conceptual block diagram illustrating an example of a mobile device.

FIG. 1 is a conceptual block diagram illustrating a mobile device 10 according to an aspect of the disclosure. The mobile device 10 can be a cellular phone, a personal digital assistant (PDA), a laptop computer, a pager, etc. The mobile device 10 comprises a cellular module 15, e.g., for providing cellular voice and/or data communications. The cellular module may utilize various communication protocols including Code Division Multiple Access (CDMA), Global System for Mobile Communications (GSM), Time Division Multiple Access (TDMA) or any other suitable communication protocol. The cellular module 15 includes a receiver 17, a transmitter 19, a processor 22, and a cellular timing module 25. The mobile device 10 may further comprise an antenna 27 coupled to the receiver 17 and transmitter 19. Although one antenna is shown in FIG. 1, the mobile device 10 may include multiple antennas coupled to the receiver and transmitter.

The receiver 17 may receive radio frequency (RF) signals from a cellular base station (BS) 30 via the antenna 27. The receiver 17 may perform amplification, filtering, frequency down-conversion, and/or demodulation on the received signal. The receiver can output the processed signal to the processor 22 for further processing including, e.g., decoding the signal to recover data from the signal. The transmitter 19 may perform amplification, modulation, and/or frequency up-conversion on signals from the processor 22 for transmission to the base station 30 via the antenna 27. Although one base station 30 is shown in FIG. 1, the cellular module 15 can be in communication with multiple base stations 30.

The mobile device 10 may further comprise a high-frequency clock 32 that may provide a high-frequency clock signal to the processor 22. The high-frequency clock 32 may comprise an oscillator that oscillates in the megahertz frequency range. The high-frequency clock may provide precise high-speed timing for digital processing in the processor 22. Because of its high operating frequency, the high-frequency clock 32 may consume substantial power when powered on. Therefore, it is desirable to minimize use of the high-frequency clock to extend the battery life of the mobile device 10.

In one aspect of the disclosure, the cellular module 15 has at least two modes of operations: an active mode and an idle mode. In an active mode, the cellular module 15 may receive and transmit user traffic e.g., a voice call, in which the receiver 17, transmitter 19 and processor 22 may be powered on.

In an idle mode, the receiver 17, transmitter 19, and processor 22 may spend most of the time in a sleep state, in which the receiver 17, transmitter 19, and processor 22 are powered down to conserve power and extend the standby time of the cellular module 15. For example, in the sleep state, power-hungry components of the receiver 17 (e.g., frequency synthesizer, mixer, etc.) and processor 22 (e.g., Digital Signal Processor (DSP)) may be powered off including the high-frequency clock 32 to conserve power. In the sleep state, the cellular module 15 may maintain timing using a low-power sleep clock that runs at a much lower frequency than the high-frequency clock 32 when the high-frequency clock 32 is powered off. The low-power sleep clock may consume substantially less power than the high-frequency clock 32. Thus, the low-power sleep clock can help conserve power when the cellular module 15 is in the sleep state. The same may apply to a Bluetooth module. Examples of sleep clocks are given below.

In an idle mode, the cellular timing module 25 periodically wakes up the receiver 17 and processor 22 from the sleep state to receive and process signals from the base station 30. The signals may include, e.g., timing information for providing precise time synchronization between the cellular module 15 and the base station 30. For the example of CDMA, the signals may include pilot signals transmitted on a paging channel. Also, for the example of CDMA, the time interval between wakeups may be 1.28 seconds, 2.56 seconds, 5.12 seconds or some other multiple of 1.28 seconds, and may be set by a slot cycle index (SIC). Although the cellular timing module 25 is illustrated as being separate from the processor 22, the cellular timing module 25 may be implement on the same processing system as the processor 22.

To further conserve power, the timing module 25 may also periodically turn on the high-frequency clock 32 at the same time as the receiver 17 and processor 22 wakeup. This has the advantage of only powering on the high-frequency clock 32 when needed to provide a high-frequency clock.

Figure 2:
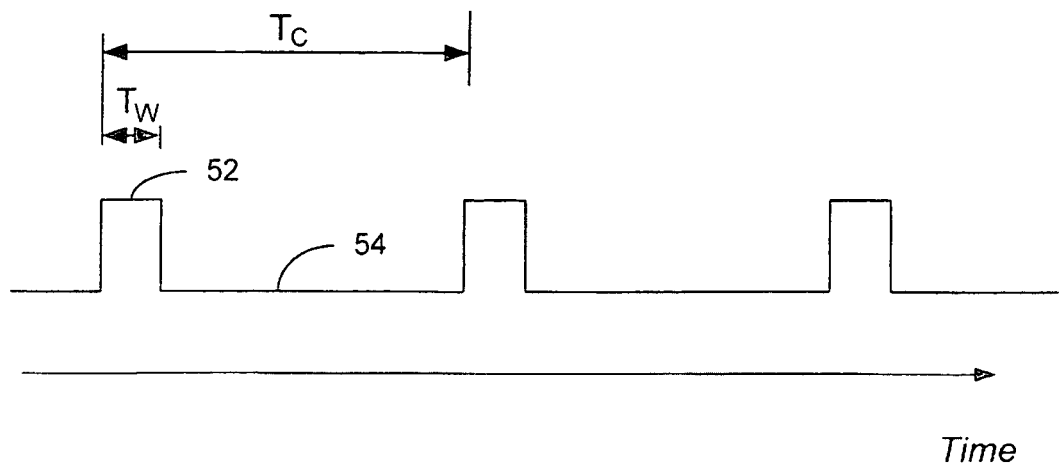
FIG. 2 is a timing diagram illustrating an example of timing of cellular wakeups in an idle mode of operation.

FIG. 2 shows a timing diagram illustrating an example of timing in an idle mode. In this example, the cellular timing module 25 periodically wakes up the receiver 17 and processor 22 from the sleep state 54 to a wakeup state 52 at wakeup time intervals $T_C$, which may be fixed or variable. For the example of CDMA, the time interval $T_C$ between wakeups may be 1.28 seconds or a multiple of 1.28 seconds as discussed above. During a wakeup cycle, the processor 22 and receiver 17 may be powered on for a wakeup time duration $T_W$. After the time duration $T_W$, the timing module 25 may power down the high-frequency clock 32, processor 22 and receiver 17 and stay in the sleep state 54 until the next wakeup cycle.

Referring back to FIG. 1, in one aspect of the disclosure, the mobile device 10 also comprises a Bluetooth module 35 for providing the mobile device 10 with Bluetooth capabilities including short-range RF communications with other Bluetooth-enabled devices, e.g., a wireless headset. The cellular module 15 and the Bluetooth module 35 may be on separate integrated chips (e.g., Application Specific Integrated Chips (ASICs)) or on the same integrated chip, and may share resources on the mobile device 10, such as the high-frequency clock 32.

The Bluetooth module 35 may comprise a receiver 37, a transmitter 39, a processor 42, and a Bluetooth timing module 45. The mobile device 10 may comprise an antenna 37 coupled to the receiver 37 and transmitter 39 of the Bluetooth module 35. Although one antenna 35 is shown in FIG. 1, the mobile device 10 may include multiple antennas coupled to the receiver 37 and transmitter 39. Although the Bluetooth timing module 45 is illustrated as being separate from the processor 42, the Bluetooth timing module 45 may be implement on the same processing system (or the same processor) as the processor 42. It should be noted that some or all of the cellular timing module 25, the Bluetooth timing module 45, the processor 22, and the processor 42 may be implemented on the same processing system (or the same processor).

The receiver 37 may receive radio frequency (RF) signals from other Bluetooth-enabled devices via the antenna 37. The receiver 37 may perform amplification, filtering, frequency down conversion and/or demodulation on the received signal. The receiver can output the processed signal to the processor 42 for further processing including, e.g., decoding the signal to recover data from the signal. The transmitter 39 may perform amplification, modulation, and/or frequency up-conversion on signals from the processor 42 for transmission to a Bluetooth (BT) device 50 via the antenna 37.

The Bluetooth module 35 may have low-power modes of operation that involve periodic wakeups. The low-power modes may include a page scan mode and an inquiry scan mode, in which the Bluetooth timing module 45 may periodically wake up the receiver 37 and processor 42 from a sleep state to scan for page signals and inquiry signals, respectively, from other Bluetooth devices. Page signals may be transmitted from Bluetooth devices attempting to set up a connection with a Bluetooth module 35. Page signals can be targeted to a Bluetooth device with which the paging Bluetooth is attempting to establish a connection. Inquiry signals may be transmitted from Bluetooth devices attempting to discover the presence of other nearby Bluetooth devices.

The low-power modes may also include a sniff mode, in which the Bluetooth module 35 is already connected to another Bluetooth device 50. In the sniff mode, the Bluetooth timing module 45 may periodically wake up the receiver 37, transmitter 39 and processor 42 to exchange data with other Bluetooth device 50. The sniff mode conserves power by reducing activity on the link between the Bluetooth module 35 and the Bluetooth device 50. The Bluetooth module 35 may request to enter the sniff mode with the other Bluetooth device 50 by transmitting a Link Manager Protocol (LMP) message to the Bluetooth device 50. Before entering the sniff mode, the Bluetooth module 35 and the other Bluetooth device 50 may negotiate a start time for the sniff mode and the sniff time interval, i.e., time interval between wakeups.

Thus, the cellular module 15 and the Bluetooth module 35 may both have low-power modes of operation involving periodic wakeups. The cellular module 15 may have an idle mode where the cellular module 15 periodically wakes up to receive signals from the base station 30. The Bluetooth module 35 may have a page scan mode, an inquiry scan mode, and/or a sniff mode where the Bluetooth module 35 periodically wakes up to perform page scanning, inquiry scanning and/or sniffing, respectively.

A problem with conventional dual cellular/Bluetooth mobile devices is that the wakeup operations of the cellular and Bluetooth modules are performed in an asynchronous manner to each other. Such asynchronous operations consume large average power over a period of time. For example, if both the cellular and Bluetooth modules share resources (e.g., high frequency clock 32), then the cellular and Bluetooth modules may power on these resources at different times, increasing the time that the resources are powered on.

To address this problem, the wakeup operations of the cellular module 15 and Bluetooth module 35 may be synchronized according to one aspect of the disclosure. In this aspect of the disclosure, the cellular timing module 15 may send a Synchronization Indication (Sync_Ind) signal to the Bluetooth timing module 45 indicating the time of cellular wakeups in an idle mode. The Sync_Ind signal may be sent via a bus, a wire, or other link coupled between the cellular timing module 25 and the Bluetooth timing module 45. The Bluetooth timing module 45 may use the Sync_Ind signal to synchronize the Bluetooth wakeups with the cellular wakeups. Synchronizing the cellular and Bluetooth wakeups reduces the total system overhead used during wakeup operations, thereby reducing overall power consumption and extending the battery life of the mobile device. Because a cellular module typically has more stringent timing requirements than a Bluetooth module, the timing of the cellular wakeups may be used as a reference for synchronizing Bluetooth wakeups with cellular wakeups.

In one aspect of the disclosure, the Bluetooth timing module 45 may synchronize page scans and/or inquiry scans with cellular wakeups based on a received Sync_Ind signal. Examples of processes that may be performed by the Bluetooth timing module 45 to synchronize scan activities with cellular wakeups are provided later in this disclosure.

In another aspect of the disclosure the Bluetooth timing module 45 may synchronize sniff mode wakeups with cellular wakeups based on the received Sync_Ind signal. Since the timing of sniff mode wakeups may have to be negotiated with the other Bluetooth device 50, synchronizing sniff mode wakeups with cellular wakeups may be more complicated than the case of page and inquiry scans. Examples of processes that may be performed by the Bluetooth timing module 45 to synchronize sniff mode wakeups with cellular wakeups are provided later in this disclosure.

Figure 3:
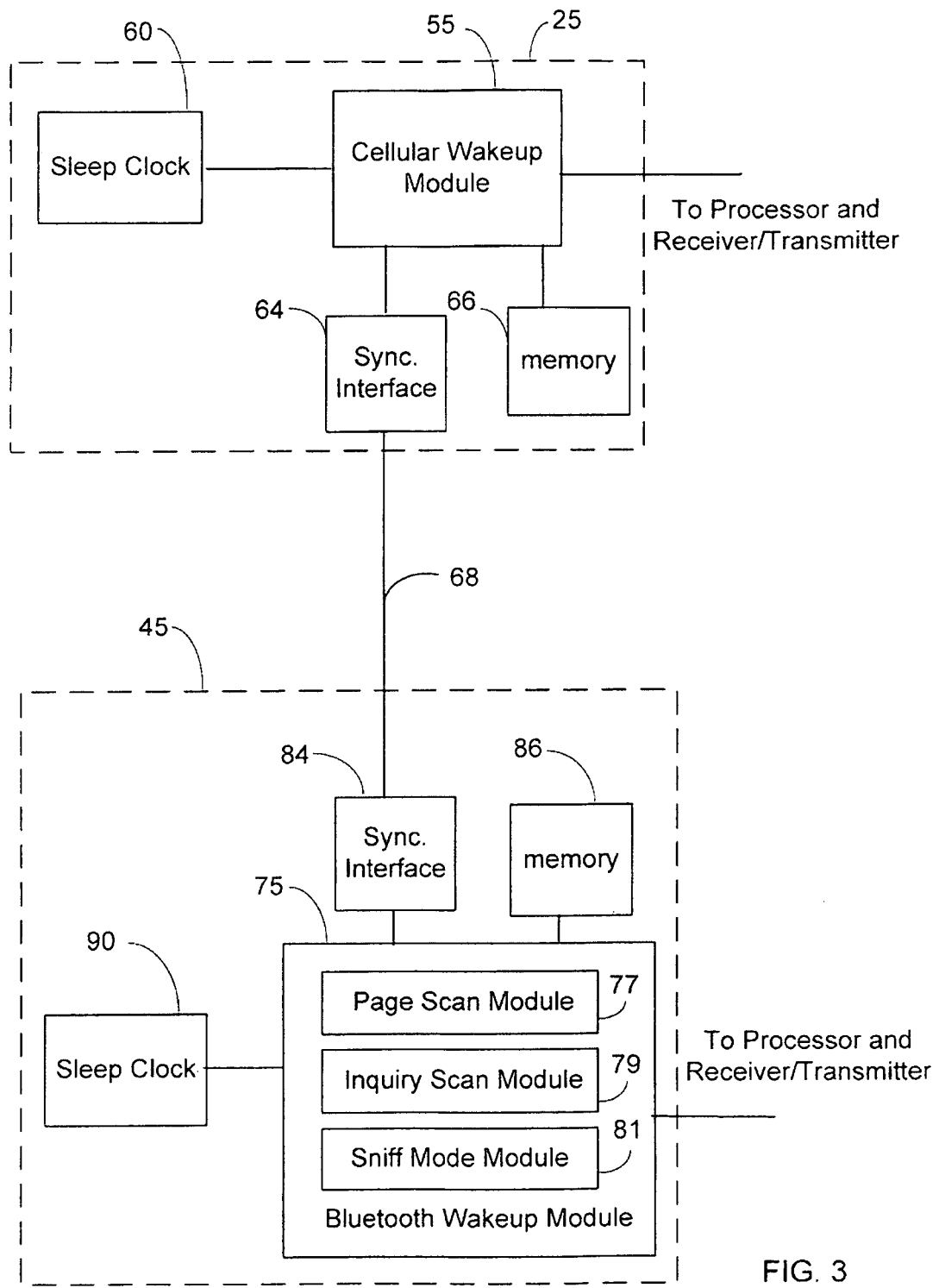
FIG. 3 is a conceptual block diagram illustrating examples of timing modules.

FIG. 3 is a conceptual block diagram illustrating the cellular timing module 25 and the Bluetooth timing module 45 (see FIG. 1) according to an aspect of the disclosure. The cellular timing module 25 may comprise a sleep clock 60, a wakeup module 55, a memory 66, and a synchronization interface 64. The sleep clock 60 may be used to keep track of time during sleep cycles, and may comprise a low-frequency low-power oscillator. The sleep clock 600 may output a clock signal to the wakeup module 55.

The wakeup module 55 may control wakeups of the processor 22 and receiver 17 (see FIG. 1) in an idle mode. The wakeup module 55 may be implemented in software, hardware or a combination thereof. Further, the wakeup module 55 may share processing resources with the processor 22. The wakeup module 55 may keep track of time during sleep cycles based on the clock signal from the sleep clock 60, and periodically wake up the receiver 17 and processor 22 to receive signals from the base station 30. The wakeup module 55 may be coupled to memory 66, which may store program code for implementing the wakeup module and parameters used by the wakeup module 55. The memory 66 may be internal memory, external memory, or a combination thereof.

The synchronization interface 64 interfaces the wakeup module 55 to the link 68 between the cellular timing module 25 and the Bluetooth timing module 45. The wakeup module 55 may use the synchronization interface 64 to transmit the Sync_Ind signal on the link 68 to the Bluetooth timing module 45.

In one aspect of the disclosure, the Sync_Ind signal may be a logic signal with a high state and a low state where the Sync_Ind signal is asserted high by the wakeup module 55 to indicate a start of a cellular wakeup. The Bluetooth timing module 45 may determine the start of cellular wakeup by detecting the high state of the Sync_Ind signal on the link 68, e.g., on the positive edge.

Figure 4:
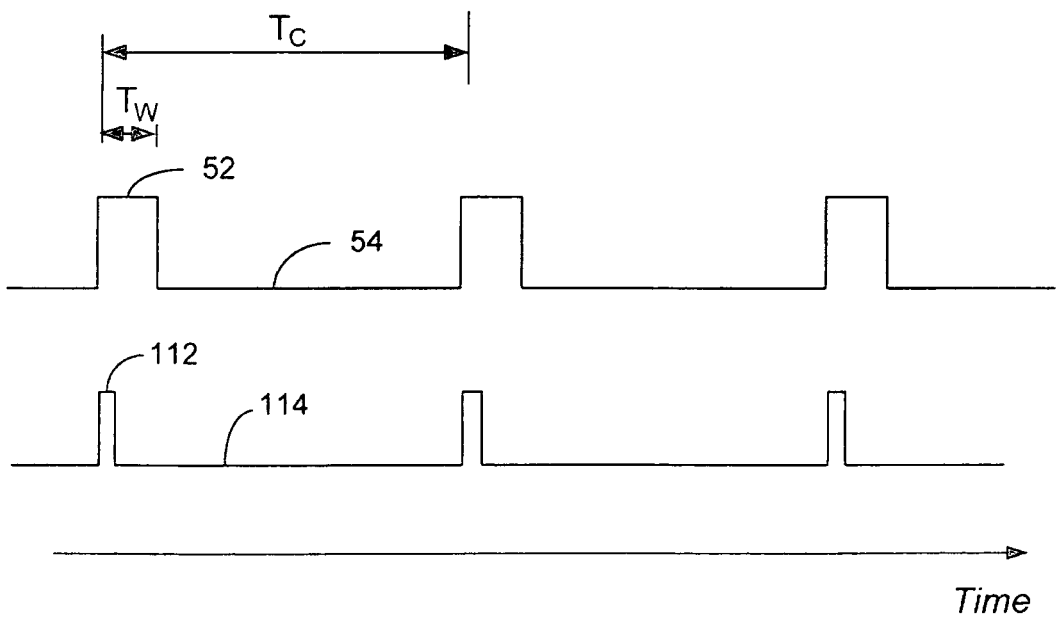
FIG. 4 is a timing diagram illustrating an example of timing of a synchronization signal.

FIG. 4 shows an example of timing for the Sync_Ind signal where the Sync_Ind signal is asserted high 112 at the start of each cellular wakeup for a short time duration, and then returned to low 114 until the next cellular wakeup. Other types of signals may also be used for the Sync_Ind signal including, e.g., optical signals. The Sync_Ind signal may be a separate signal or may be multiplexed with other signals.

In another aspect of the disclosure, the Sync_Ind signal may also be in the form of a message that includes information indicating the wakeup time of the cellular module 25. The message may include other information such as the wakeup time interval $T_C$ of the cellular module 15. In this aspect, the wakeup module 55 of FIG. 3 may generate a message and send the message to the synchronization interface 64 for transmission to the Bluetooth timing module 45 on the link 68. A message may be in an LMP format or in other message format, e.g., a host control interface (HCI) command to the Bluetooth module 35.

In FIG. 3, the Bluetooth timing module 45 may comprise a sleep clock 90, a wakeup module 75, a memory 86, and a synchronization interface 84. The sleep clock 90 may be used to keep track of time during sleep cycles, and may be similar to the sleep clock 60 of the cellular timing module 25. The cellular timing module 25 and the Bluetooth timing module 45 may share a sleep clock instead of having separate sleep clocks (e.g., the sleep clock 90 may be the sleep clock 60).

The wakeup module 75 may control wakeups of the processor 42, receiver 37 and transmitter 39 of FIG. 1 in low-power modes, and may be implemented in software, hardware or a combination thereof. The wakeup module 75 may keep track of time based on the clock signal from the sleep clock 90. The wakeup module 75 may be coupled to memory 86, which may store program code for implementing the wakeup module and parameters used by the wakeup module 75.

In one aspect of the disclosure, the wakeup module 75 may comprise a page scan module 77, an inquiry scan module 79, and a sniff mode module 81.

The page scan module 77 may control the timing of page scan wakeups when the Bluetooth module 25 is in a page scan mode. During a page scan wakeup, the page scan module 77 may periodically power on the receiver 37 and processor 42 to perform a page scan. As an example, the time interval between page scans may be approximately 1.28 seconds with each page scan lasting approximately 11.25 milliseconds. The page scan module 77 may use the Sync_Ind signal from the cellular timing module 60 to synchronize page scan wakeups with cellular wakeups. In one aspect of the disclosure, the page scan module 77 may wakeup the processor 42 and receiver 37 to perform a page scan at approximately the start of a cellular wakeup as indicated by a received Sync_Ind signal.

Referring to FIGS. 1, 3 and 4, in another aspect of the disclosure, the page scan module 77 may wakeup the processor 42 and receiver 37 at anytime during the wakeup time duration $T_W$ of the current cellular wakeup so that the page scan overlaps with the wakeup time duration $T_W$. The Sync_Ind signal may include information on the wakeup time duration $T_W$ of the cellular module 25, or the wakeup time duration $T_W$ may be stored in memory 86. In this aspect, the page scan module 77 may use the start time of a cellular wakeup and the wakeup time duration $T_W$ to schedule a page scan wakeup at some time during the wakeup time duration $T_W$ of a cellular wakeup.

In another aspect of the disclosure, the page scan module 77 may program the time interval between page scan wakeups to be equal to the cellular wakeup time interval $T_C$ or a multiple thereof so that subsequent page scans are synchronized with cellular wakeups. The page scan mode 77 may also already have a wakeup time interval (e.g., 1.28 seconds) that coincides with the cellular wakeup time interval $T_C$ (e.g., 1.28 seconds). In this aspect of the disclosure, the page scan module 77 may determine the cellular wakeup time interval $T_C$ based on a time duration between the reception of adjacent Sync_Ind signals, or the cellular wakeup time interval $T_C$ may also be stored in memory. For the example in which the Sync_Ind signal is in the form of a message, the cellular wakeup time interval $T_C$ may be included in the message.

The inquiry scan module 79 may control the timing of inquiry scan wakeups when the Bluetooth module is in the inquiry scan mode. During an inquiry scan wakeup, the inquiry scan module 79 may power on the receiver 37 and processor 39 to perform an inquiry scan. After an inquiry scan is complete, the inquiry scan module can power down the receiver 37 and the processor 42. The inquiry scan module 79 may use the Sync_Ind signal from the cellular timing module to synchronize inquiry scan wakeups with cellular wakeups. The inquiry scan module 79 may perform the same or similar operations discussed above for the page scan module 77 to synchronize inquiry scan wakeups with cellular wakeups.

The sniff mode module 81 may control the timing of sniff mode wakeups when the Bluetooth module 35 is in sniff mode. During a sniff mode wakeup, the sniff mode module may power on the receiver 37, transmitter 39 and processor 42 to exchange data with another Bluetooth device 50 participating in the sniff mode. After the data exchange is complete, the sniff mode module 81 may power down the receiver 37, transmitter 39 and the processor 42. The sniff mode module 81 may use the Sync_Ind signal from the cellular timing module to synchronize sniff mode wakeups with cellular wakeups.

Since the timing of sniff mode wakeups may need to be synchronized between the Bluetooth module 35 and the other Bluetooth device 50, the sniff mode module 81 may negotiate a sniff start time and a sniff time interval with other Bluetooth device 50 that achieves synchronism with cellular wakeups based on the Sync_Ind signal. In one aspect of the disclosure, the sniff mode module 81 may predict a start time of a future cellular wakeup based on the start time of a current cellular wakeup and the wakeup time interval $T_C$. The sniff mode module 81 may then negotiate a sniff start time to coincide with the start time of the predicted future cellular wakeup and a sniff time interval that is equal to the wakeup time interval $T_C$ or a multiple thereof. If the other Bluetooth device 50 agrees to the sniff start time and the sniff time interval, then the sniff mode wakeups is synchronized with subsequent cellular wakeups.

Still referring to FIGS. 1, 3 and 4, examples of synchronization processes that may be performed by the Bluetooth timing module 45 are now described for cases where a Bluetooth module is in a page scan mode, inquire scan mode or both.

In a page scan mode, the page scan module 77 according to one aspect of the disclosure can check whether the next scheduled page scan is synchronized with a cellular wakeup. The page scan module 77 may do this by checking whether the following condition is met at the start of a cellular wakeup:

$$t_P \leq T_{th\_P} \quad (1)$$

where $t_P$ is the remaining time for the next scheduled page scan, and $T_{th\_P}$ is a page scan timer setting threshold, where $0 \leq T_{th\_P} \leq T_W$. If the remaining time $t_P$ for the next page scan is less than or equal to the threshold $T_{th\_P}$, then the page scan module 77 does not reset the remaining time $t_P$ for the next page scan. If the remaining time $t_P$ for the next page scan is greater than the threshold $T_{th\_P}$, then the page scan module 77 resets the remaining time $t_P$ for the next page scan to a reset time $t_{P\_reset}$. The reset time $t_{P\_reset}$ may be equal to zero, in which case the next page scan occurs at the next immediately available Bluetooth slot. A reset $t_{P\_reset}$ may also be set to any time that is less than the cellular wakeup time duration $T_W$ to ensure that the page scan overlaps the cellular wakeup time duration $T_W$.

Figure 5:
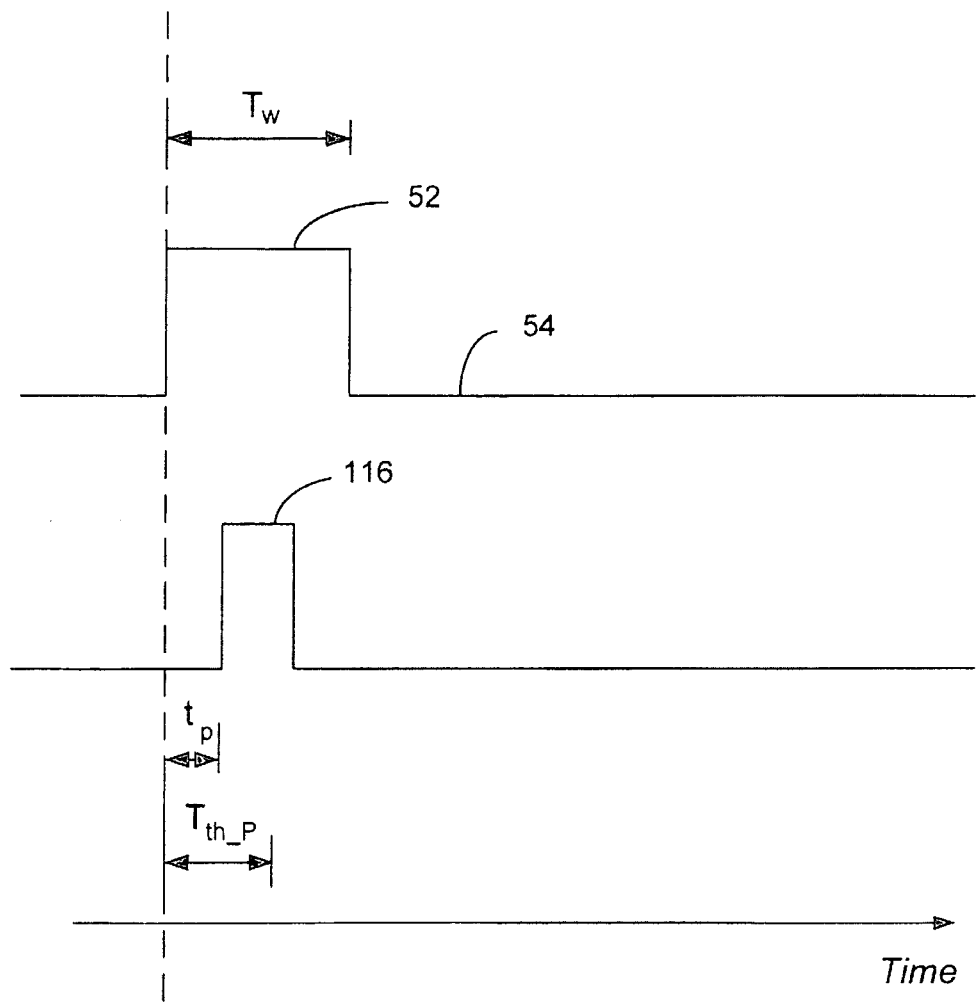
FIG. 5 is a timing diagram illustrating an example of timing of a page scan.

FIG. 5 is a timing diagram showing an example in which the remaining time $t_P$ for the next page scan is less than the threshold $T_{th\_P}$ at the start of a cellular wakeup. In this example, the next scheduled page scan 116 overlaps the cellular wakeup time duration $T_W$, and the page scan module 77 does not reset the time of the next page scan.

Figure 6:
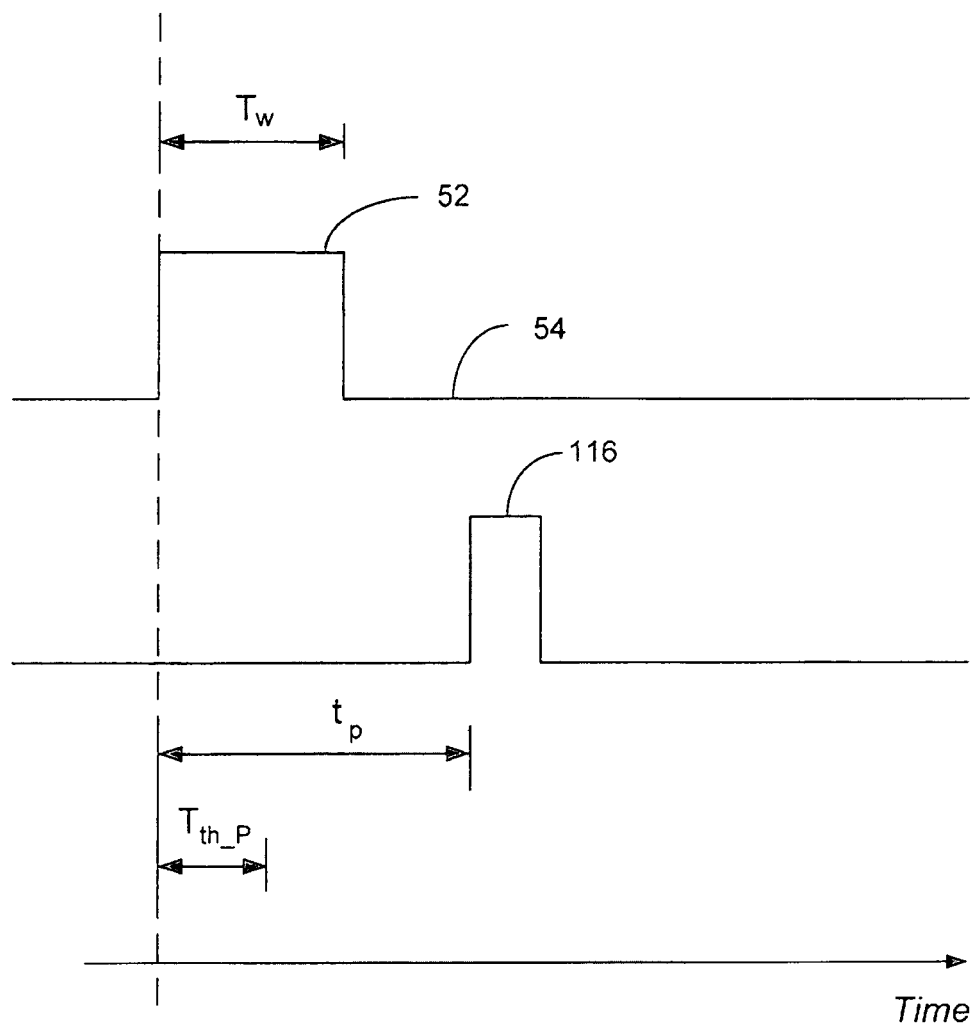
FIG. 6 is a timing diagram illustrating another example of timing of a page scan.

FIG. 6 is a timing diagram showing an example in which the remaining time $t_P$ for the next page scan is greater than the threshold $T_{th\_P}$ at the start of a cellular wakeup. In this example, the page scan module 77 resets the remaining time $t_P$ for the next page scan 116 to reset time $t_{P\_reset}$, which may be equal to zero or some other time that is less than the cellular wakeup time duration $T_W$.

Similarly, in an inquiry scan mode, the inquiry scan module 79 according to one aspect of the disclosure can check whether the next scheduled inquiry scan is synchronized with a cellular wakeup. The inquiry scan module 79 may do this by checking whether the following condition is met at the start of cellular wakeup:

$$t_I \leq T_{th\_I} \quad (2)$$

where $t_I$ is the remaining time for the next scheduled inquiry scan, and $T_{th\_I}$ is an inquiry scan timer setting threshold where $0 \leq T_{th\_I} \leq T_W$. If the remaining time $t_I$ for the next inquiry scan is less than or equal to the threshold $T_{th\_I}$, then the inquiry scan module 79 does not reset the remaining time $t_I$ for the next inquiry scan. If the remaining time $t_I$ for the next inquiry scan is greater than the threshold $T_{th\_I}$, then the inquiry scan module resets the remaining time $t_I$ for the next inquiry scan to a reset time $t_{I\_reset}$. A reset time $t_{I\_reset}$ may be equal to zero, in which case the next inquiry scan occurs at the next immediately available Bluetooth slot. A reset $t_{I\_reset}$ may also be set to any time that is less than the cellular wakeup time duration $T_W$ to ensure that the inquiry scan overlaps the cellular wakeup time duration $T_W$.

Figure 7:
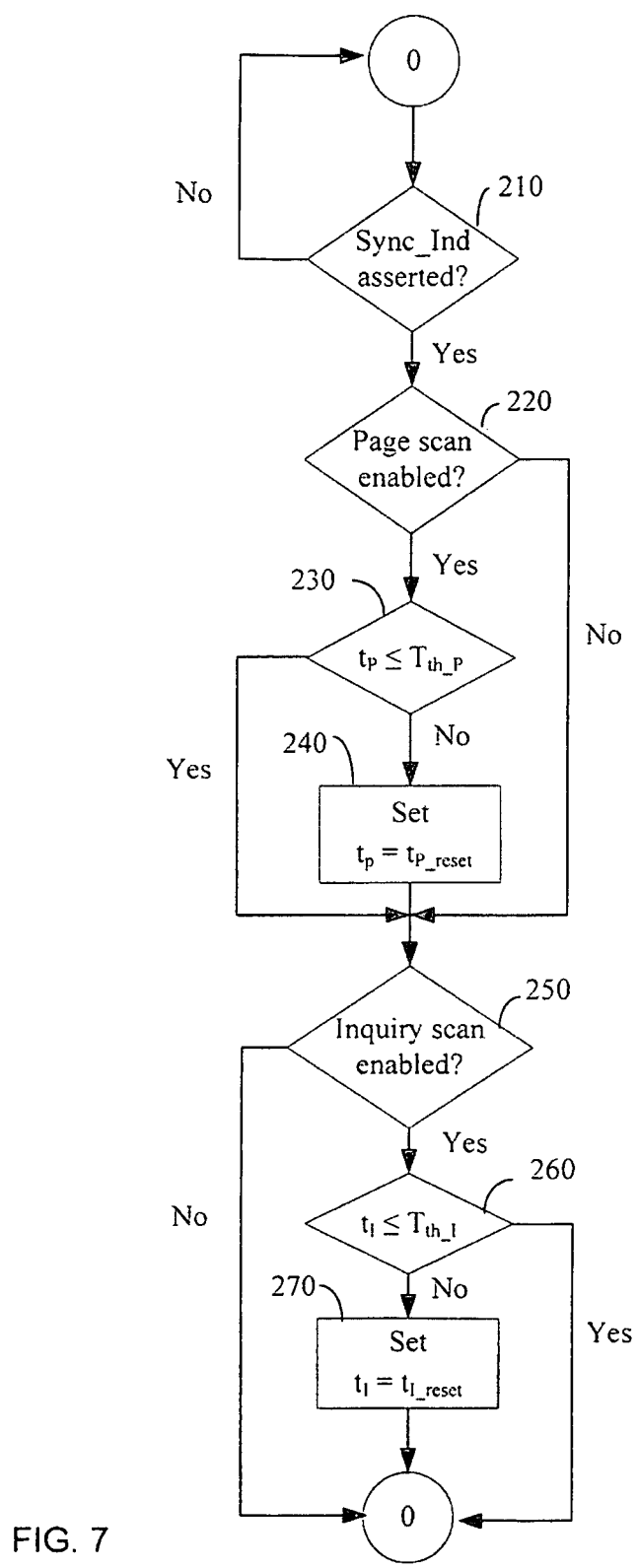
FIG. 7 is a flow chart illustrating an example of operation of synchronizing scan activities with cellular wakeups.

FIG. 7 is a flowchart showing an example of a process for synchronizing page and inquiry scans with cellular wakeups. The process may be performed by the Bluetooth wakeup module 75 of FIG. 3.

In step 210, the process determines whether a Sync_Ind signal has been asserted. If the Sync_Ind signal has not been asserted, then the process is reset. If the Sync_Ind signal has been asserted indicating the start of a cellular wakeup, then the process proceeds to step 220.

In step 220, the process determines whether a Bluetooth page scan is enabled. If the page scan is not enabled, then the process proceeds to step 250. If page scan is enabled, then the process proceeds to step 230. In step 230, the process determines whether the remaining time $t_P$ for the next scheduled page scan is equal to or less than the threshold $T_{th\_P}$. If the remaining time $t_P$ is equal to or less than the threshold $T_{th\_P}$, then the process proceeds to step 250. If the remaining time $t_P$ is greater than the threshold $T_{th\_P}$, then the process proceeds to step 240. In step 240, the process resets the remaining time $t_P$ for the next page scan to reset time $t_{P\_reset}$, which may be equal to zero or some other time that is less than the cellular wakeup time duration $T_W$.

In step 250, the process determines whether Bluetooth inquiry scan is enabled. If inquiry scan is not enabled, then the process is reset. If inquiry scan is enabled, then the process proceeds to step 260. In step 260, the process determines whether the remaining time $t_I$ for the next scheduled inquiry scan is equal to or less than the threshold $T_{th\_I}$. If the remaining time $t_I$ is equal to or less than the threshold $T_{th\_I}$, then the process is reset. If the remaining time $t_I$ is greater than the threshold $T_{th\_I}$, then the process proceeds to step 270. In step 270, the process resets the remaining time $t_I$ for the next inquiry scan to reset time $t_{I\_reset}$, which may be equal to zero or some other time that is less than the cellular wakeup time duration $T_W$.

The process ensures that the page and inquiry scans overlap with the scan activity of the cellular module. The reset times $t_{P\_reset}$ and $t_{I\_reset}$ for the page and inquiry scans, respectively, may be set to different times so that a page scan and a inquiry scan occur at different times within a cellular wakeup time duration $T_W$. Thus, although the page scan and the inquiry scan occur at different times in this example, they both overlap the cellular wakeup time duration $T_W$ for power conservation.

Examples of synchronization processes that may be performed by the sniff mode module 81 of FIG. 3 are now described for the cases where the Bluetooth module 35 is in a sniff mode. The Bluetooth module may be in sniff mode with one or multiple Bluetooth devices connected to the Bluetooth module.

In a sniff mode, the sniff mode module 81 according to one aspect of the disclosure can check whether the next sniff wakeup for each Bluetooth connection is synchronized with cellular wakeups. For each Bluetooth connection in the sniff mode, the sniff mode module 81 may do this by checking whether the following condition is met at the start of a cellular wakeup:

$$t_{S\_i} \leq T_{th\_S\_i} \qquad (3)$$

where $t_{S\_i}$ is the remaining time for the next scheduled sniff wakeup for the ith Bluetooth connection, and $T_{th\_S\_i}$ is a sniff mode timer setting threshold for the ith connection where $0 \leq T_{th\_S\_i} \leq T_W$. If the remaining time $t_{S\_i}$ for the next sniff wakeup is less than or equal to the threshold $T_{th\_S\_i}$, then the sniff mode module 81 does not reset the time of the next sniff wakeup for the ith connection. If the remaining time $t_{S\_i}$ for the next sniff wakeup is less than or equal to the threshold $T_{th\_S\_i}$, then the sniff mode module 81 may exit the sniff mode with the Bluetooth device corresponding to the ith connection, and renegotiate the sniff start time and sniff time interval with the Bluetooth device in order to synchronize subsequent sniff wakeups with cellular wakeups.

FIGS. 8A and 8B are flowcharts showing an example of a process for synchronizing sniff wakeups with cellular wakeups when the Bluetooth module is connected with one or more Bluetooth devices. The process may be performed by the Bluetooth wakeup module 75.

In step 305, the process determines whether the Sync_Ind signal has been asserted. If the Sync_Ind signal has not been asserted, then the process is reset. If the Sync_Ind signal has been asserted indicating the start of a cellular wakeup, then the process proceeds to step 310. In step 310, the process sets time parameter $t_1$ equal to the current time, which corresponds approximately to the start time of the current cellular wakeup. The process then proceeds to step 315, in which the process determines whether the ith connection is already in the sniff mode. If the ith connection is not in the sniff mode, then the process proceeds to step 335. If the ith connection is in the sniff mode, then the process proceeds to step 320. In step 320, the process determines whether the remaining time $t_{S\_i}$ for the next sniff wakeup is equal to or less than the threshold $T_{th\_S\_i}$. If the remaining time $t_{S\_i}$ for the next sniff wakeup is less than or equal to the threshold $T_{th\_S\_i}$, then the process is reset. If the remaining time $t_{S\_i}$ for the next sniff wakeup is greater than the threshold $T_{th\_S\_i}$, then the process attempts to exit the sniff mode with the Bluetooth device in the ith connection in step 325. The process then proceeds to step 330 to determine whether it successfully exited the sniff mode. If not, then the process returns to step 325 to try again. If the process is successful, then the process proceeds to step 335.

In step 335, the process determines whether the ith connection needs to enter the sniff mode. If not, then the process is reset. If the ith connection needs to enter the sniff mode, then the process sets a time parameter $t_2$ equal to the current time. The difference between the two time parameters $t_2$ and $t_1$ gives the approximate time that has elapsed since the start of the cellular wakeup. In step 340, the processes sets a start time for the sniff mode according to the following equation:

$$t_{Start\_i} = N \cdot T_C - (t_2 - t_1) \qquad (4)$$

where $t_{Start\_i}$ is the start time for the sniff mode, N is a positive integer, and $T_C$ is the time interval between cellular wakeups. Equation 4 aligns the start time $t_{Start\_i}$ of the sniff mode with the start of a predicted future cellular wakeup. The time difference $(t_2 - t_1)$ takes into account the time that has elapsed since the start of the cellular wakeup. The parameter N may be a programmable parameter that determines when the sniff activity begins. For example, N may be set based on an estimate of how long it will take to negotiate the sniff mode parameters with the other Bluetooth device in the ith connection.

In step 345, the process negotiates the sniff start time $t_{Start\_i}$ and sniff time interval $T_{S\_i}$ with the other Bluetooth device in the ith connection. The sniff time interval $T_{S\_i}$ may be equal to or a multiple of the cellular time interval $T_C$. This ensures that the sniff wakeups are synchronized with cellular wakeups. The sniff time interval $T_{S\_i}$ may also be a fractional multiple of the cellular time interval $T_C$. For example, if the sniff time interval $T_{S\_i}$ is half the cellular time interval $T_C$, then every other sniff mode wakeup is synchronized with a cellular wakeup. While not synchronizing every sniff mode wakeup with a cellular wakeup, this arrangement still provides power savings.

After the negotiation, the process enters the sniff mode with the other Bluetooth device in the ith connection in step 350. The process then proceeds to step 355 to determine whether the final sniff time interval $T_{S\_i}$ after negotiation with the other Bluetooth device provides synchronism between sniff mode wakeups and cellular wakeups. The process may do this by determining whether the final $T_{S\_i}$ is a multiple of $T_C/M$ where M is a positive integer. M may be a programmable parameter that depends on the minimal sniff time interval of all the connections. M may be greater than one when the minimal sniff time interval is less than the cellular time interval $T_C$. If the final sniff time interval provides synchronism, then the process resets. If not, then the process may end further attempts to synchronize sniff mode wakeups with cellular wakeups for the ith connection.

The process shown in FIGS. 8A and 8B may be performed for each connection between the Bluetooth module and another Bluetooth device in a sniff mode.

Figure 9A:
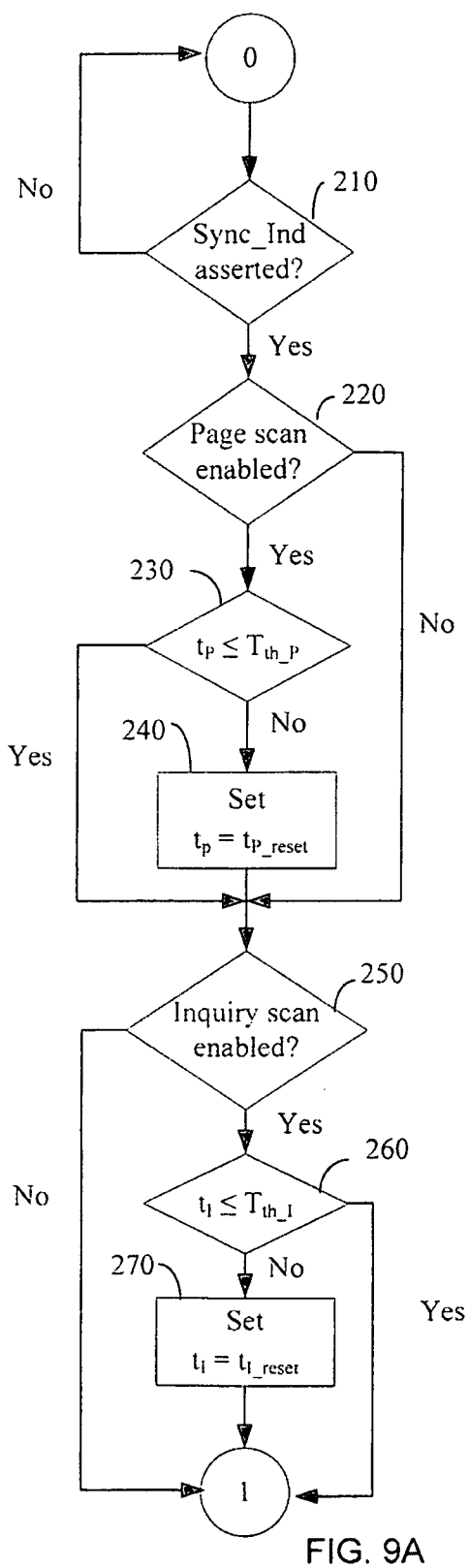
FIGS. 9A to 9C are flow charts illustrating an example of operation of synchronizing scan and sniff activities with cellular wakeups.
Figure 9B:
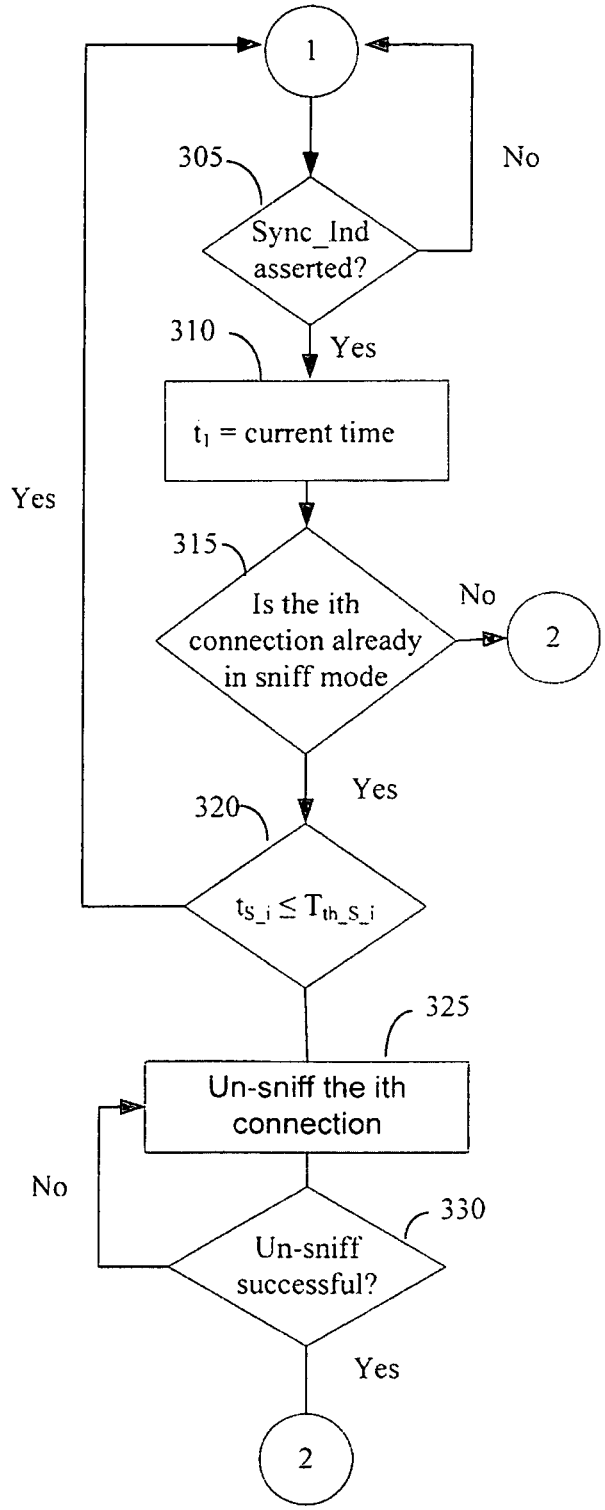
Figure 9C:
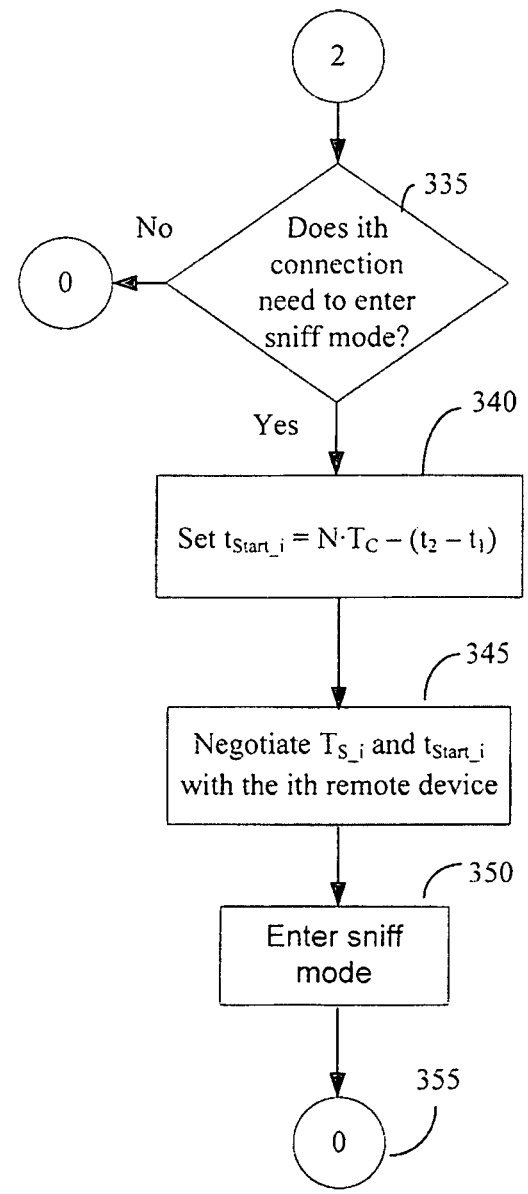

In cases where a Bluetooth module is both in a scan mode (page and/or inquiry scan) and connected to one or more remote Bluetooth devices in a sniff mode, the processes described for each may be combined to synchronize the Bluetooth scan activities and sniff mode activities with cellular wakeups. By way of example, FIGS. 9A to 9C show flowcharts for a process of synchronizing the scan activities and sniff mode activities of the Bluetooth module 35 of FIG. 1 with cellular wakeups, in which processes in FIGS. 7, 8A and 8B have been combined. In this example, a Bluetooth wakeup module 75 of FIG. 3 may synchronize the scan activities with cellular wakeups, and then synchronizes the sniff mode activities with cellular wakeups. One skilled in the art would appreciate that the sniff mode synchronization may be performed first.

Figure 10:
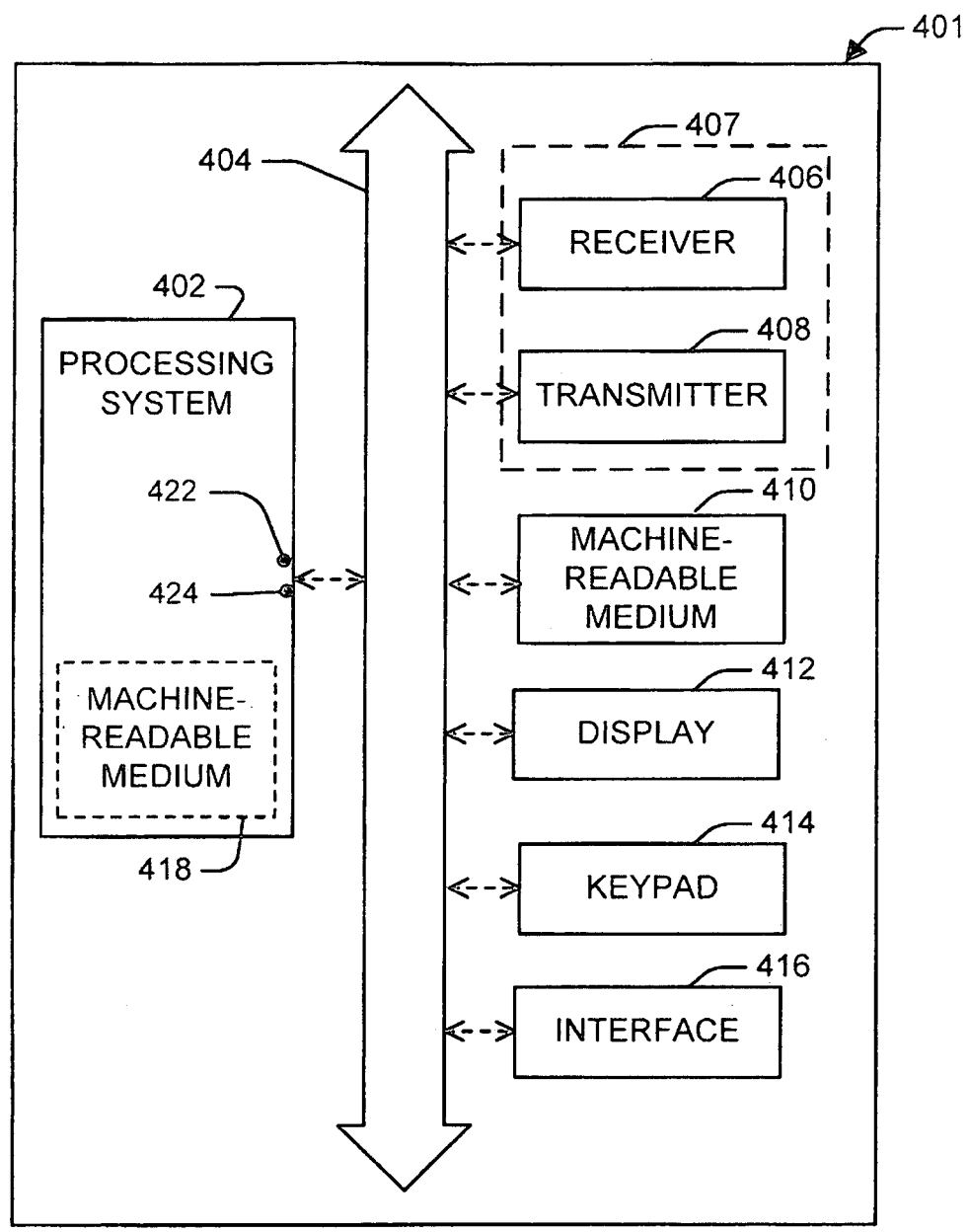
FIG. 10 is a conceptual block diagram illustrating an example of a system.

FIG. 10 is a conceptual block diagram illustrating an example of a system. A system 401 may be a mobile device, e.g., a dual cellular/Bluetooth mobile device. The system 401 includes a processing system 402, which may implement the processors 22 and 42, the cellular timing module 25, the Bluetooth timing module 45, or a combination thereof. The processing system 402 is capable of communication with at least one receiver 406 and at least one transmitter 408 through a bus 404 or other structures or devices. It should be understood that communication means other than busses can be utilized with the disclosed configurations. The processing system 402 can generate audio, video, multimedia, and/or other types of data to be provided to the transmitter 408 for communication. In addition, audio, video, multimedia, and/or other types of data can be received at the receiver 406, and processed by the processing system 402.

The processing system 402 may include a general-purpose processor or a specific-purpose processor for executing instructions and may further include volatile or non-volatile memory for storing data and instructions for software programs. The instructions, which may be stored in a machine-readable medium 410 and/or 418, may be executed by the processing system 402 to control and manage wakeup operations, as well as provide other communication and processing functions. The instructions may also include instructions executed by the processing system 402 for various user interface devices, such as a display 412 and a keypad 414. The processing system 402 may include an input port 422 and an output port 424. Each of the input port 422 and the output port 424 may include one or more ports. The input port 422 and the output port 424 may be the same port (e.g., a bi-directional port) or may be different ports.

The processing system 402 may be implemented using software, hardware, or a combination of both. By way of example, the processing system 402 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processing system 402 may also include one or more machine-readable media (e.g., 418) for storing software. A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 418) may include storage integrated into a processor, such as might be the case with an ASIC. Machine-readable media (e.g., 410) may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 402. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by mobile device processor. Instructions can be, for example, a computer program including code.

An interface 416 may be any type of interface and may reside between any of the components shown in FIG. 10. An interface 416 may also be, for example, an interface to the outside world (e.g., an Internet network interface). A transceiver block 407 may represent one or more transceivers, and each transceiver may include a receiver 406 and a transmitter 408. A transceiver block 407 may represent, for example, the cellular transceiver and Bluetooth transceiver shown in FIG. 1. A functionality implemented in a processing system 402 may be implemented in a portion of a receiver 406, a portion of a transmitter 408, a portion of a machine-readable medium 410, a portion of a display 412, a portion of a keypad 414, or a portion of an interface 416, and vice versa.

Figure 11:
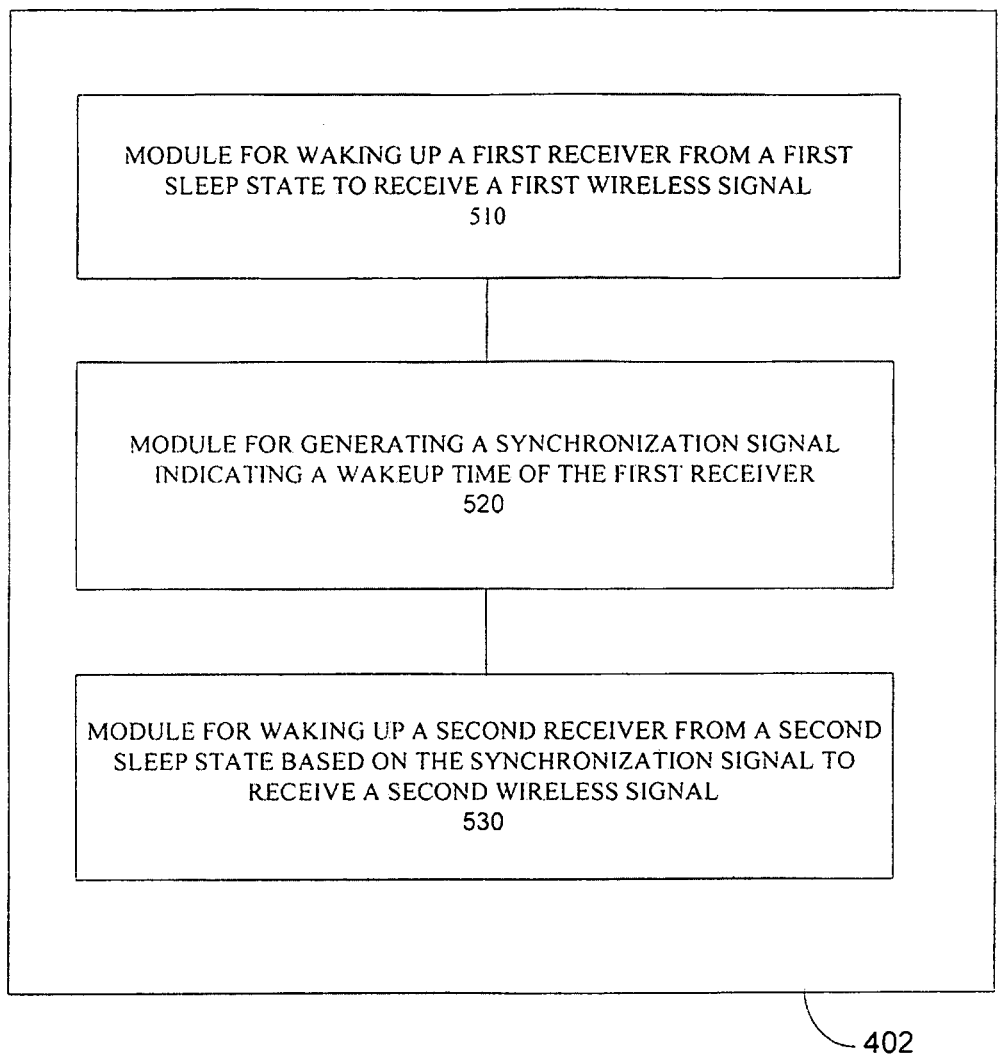
FIG. 11 is a conceptual block diagram illustrating an example of the functionality of a processing system in an electronic device.

FIG. 11 is a conceptual block diagram illustrating an example of the functionality of a processing system in an electronic device. A processing system 402 (see FIG. 10) of an electronic device includes a module 510 for waking up a first receiver from a first sleep state to receive a first wireless signal and a module 520 for generating a synchronization signal indicating a wakeup time of the first receiver. The processing system 402 further includes a module 530 for waking up a second receiver from a second sleep state based on the synchronization signal to receive a second wireless signal.

Figure 12:
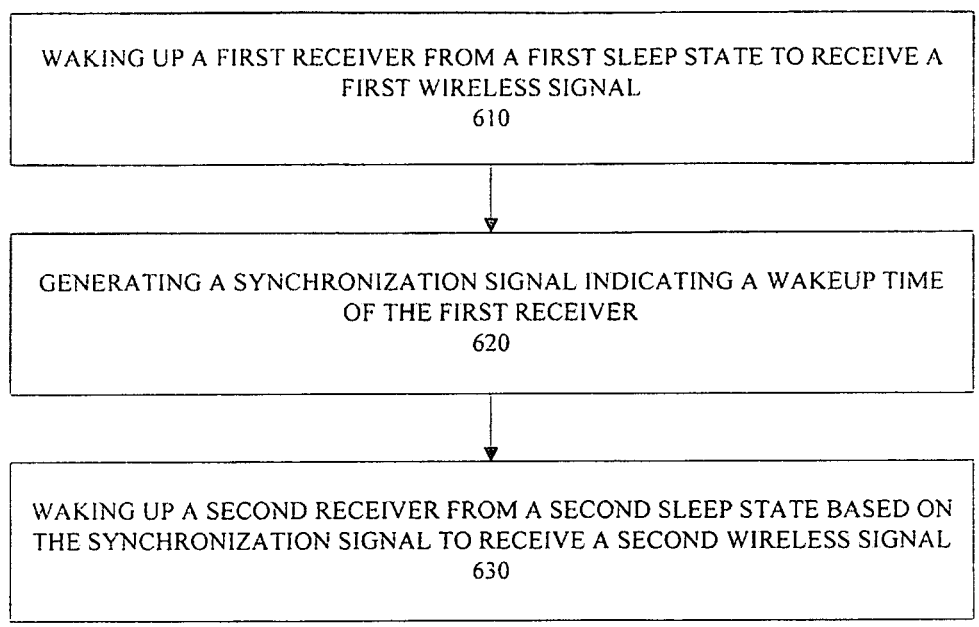
FIG. 12 is a flow chart illustrating an exemplary operation of synchronizing wakeup operations of an electronic device.

FIG. 12 is a flow chart illustrating an exemplary operation of synchronizing wakeup operations of an electronic device. In step 610, a processing system 402 may wake up a first receiver from a first sleep state to receive a first wireless signal. In step 620, the processing system 402 may generate a synchronization signal indicating a wakeup time of the first receiver. In step 630, the processing system 402 may wake up a second receiver from a second sleep state based on the synchronization signal to receive a second wireless signal.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Examples of particular communications protocols and formats have been given to illustrate the subject technology. However, the subject technology is not limited to these examples and applies to other communications protocols and formats.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An electronic device, comprising:
   a first receiver configured to receive a first wireless signal;
   a first timing module configured to wake up the first receiver from a first sleep state and to generate a synchronization signal indicating a wakeup time of the first receiver;
   a second receiver configured to receive a second wireless signal; and
   a second timing module configured to:
     receive the synchronization signal;
     wake up the second receiver from a second sleep state based on the synchronization signal; and
     predict a future wakeup time of the first receiver based on the synchronization signal and a time interval between wakeups of the first receiver.

2. The electronic device of claim 1, wherein the first wireless signal comprises a cellular signal from a base station.

3. The electronic device of claim 2, wherein the second wireless signal comprises a Bluetooth signal from a wireless device.

4. The electronic device of claim 1, further comprising a processor configured to process a signal from the second receiver, wherein the second timing module is further configured to wake up the processor from a third sleep state based on the synchronization signal.

5. The electronic device of claim 4, wherein the second wireless signal comprises a Bluetooth signal.

6. The electronic device of claim 1, further comprising a processor configured to process a signal from the second receiver, wherein the second timing module is further configured to wake up the second receiver and the processor based on the synchronization signal to perform a page scan operation.

7. The electronic device of claim 1, further comprising a processor configured to process a signal from the second receiver, wherein the second timing module is further configured to wake up the second receiver and the processor based on the synchronization signal to perform an inquiry scan operation.

8. The electronic device of claim 1, further comprising a processor configured to process a signal from the second receiver, wherein the second timing module is further configured to wake up the second receiver and the processor based on the synchronization signal to perform a sniff mode operation.

9. The electronic device of claim 1, wherein the second timing module is further configured to negotiate a sniff start time with a wireless device based on the synchronization signal.

10. The electronic device of claim 1, wherein the second timing module is further configured to negotiate a sniff time interval with a wireless device based on the synchronization signal.

11. The electronic device of claim 1, wherein the second timing module is further configured to negotiate a sniff start time with a wireless device based on the predicted wakeup time.

12. A method of synchronizing wakeup operations of an electronic device, comprising:
   waking up a first receiver from a first sleep state to receive a first wireless signal;

generating a synchronization signal indicating a wakeup time of the first receiver;

waking up a second receiver from a second sleep state based on the synchronization signal to receive a second wireless signal; and predicting a future wakeup time of the first receiver based on the synchronization signal and a time interval between wakeups of the first receiver.

13. The method of claim 12, wherein the first wireless signal comprises a cellular signal.

14. The method of claim 13, wherein the second wireless signal comprises a Bluetooth signal.

15. The method of claim 12, further comprising waking up a processor from a third sleep state based on the synchronization signal to process a signal from the second receiver.

16. The method of claim 15, wherein the second wireless signal comprises a Bluetooth signal.

17. The method of claim 12, further comprising waking up the second receiver and a processor based on the synchronization signal to perform a page scan operation.

18. The method of claim 12, further comprising waking up the second receiver and a processor based on the synchronization signal to perform an inquiry scan operation.

19. The method of claim 12, further comprising waking up the second receiver and a processor based on the synchronization signal to perform a sniff mode operation.

20. The method of claim 12, further comprising negotiating a sniff start time with a wireless device based on the synchronization signal.

21. The method of claim 12, further comprising negotiating a sniff time interval with a wireless device based on the synchronization signal.

22. The method of claim 12, further comprising:
negotiating a sniff start time with a wireless device based on the predicted wakeup time.

23. A system for synchronizing wakeup operations, comprising:
means for waking up a first receiver of an electronic device from a first sleep state to receive a first wireless signal;
means for generating a synchronization signal indicating a wakeup time of the first receiver;
means for waking up a second receiver of the electronic device from a second sleep state based on the synchronization signal to receive a second wireless signal; and
means for predicting a future wakeup time of the first receiver based on the synchronization signal and a time interval between wakeups of the first receiver.

24. The system of claim 23, wherein the first signal comprises a cellular signal.

25. The system of claim 24, wherein the second wireless signal comprises a Bluetooth signal.

26. The system of claim 23, further comprising:
means for waking up a processor from a third sleep state based on the synchronization signal to process a signal from the second receiver.

27. The system of claim 26, wherein the second wireless signal comprises a Bluetooth signal.

28. The system of claim 23, further comprising:
means for waking up the second receiver and a processor based on the synchronization signal to perform a page scan operation.

29. The system of claim 23, further comprising:
means for waking up the second receiver and a processor based on the synchronization signal to perform an inquiry scan operation.

30. The system of claim 23, further comprising:
means for waking up the second receiver and a processor based on the synchronization signal to perform a sniff mode operation.

31. The method of claim 23, further comprising:
means for negotiating a sniff start time with a wireless device based on the synchronization signal.

32. The method of claim 23, further comprising:
means for negotiating a sniff time interval with a wireless device based on the synchronization signal.

33. The method of claim 23, further comprising:
means for negotiating a sniff start time with a wireless device based on the predicted wakeup time.

34. A processing system, comprising:
an input port;
an output port; and
a processor configured to
receive a synchronization signal indicating a wakeup time of a first receiver of an electronic device;
wake up a second receiver of the electronic device from a sleep state based on the synchronization signal to receive a wireless signal; and
wake up a second processor from a second sleep state based on the synchronization signal, wherein the second processor is configured to process a signal from the second receiver.

35. The processing system of claim 34, wherein the second processor is further configured to wakeup the first receiver and to generate the synchronization signal.

36. The processing system of claim 34, wherein the first receiver is configured to receive a cellular signal.

37. The processing system of claim 36, wherein the second receiver is configured to receive a Bluetooth signal.

38. The processing system of claim 34, wherein the wireless signal comprises a Bluetooth signal.

39. The processing system of claim 34, wherein the processor is configured to wake up the second receiver and the second processor based on the synchronization signal to perform a page scan operation.

40. The processing system of claim 34, wherein the processor is further configured to wake up the second receiver and the second processor based on the synchronization signal to perform an inquiry scan operation.

41. The processing system of claim 34, wherein the processor is further configured to wake up the second receiver and the second processor based on the synchronization signal to perform a sniff mode operation.

42. The processing system of claim 34, wherein the processor is further configured negotiate a sniff start time with a wireless device based on the synchronization signal.

43. The processing system of claim 34, wherein the processor is further configured negotiate a sniff time interval with a wireless device based on the synchronization signal.

44. The processing system of claim 34, wherein the processor is further configured to:
predict a future wakeup time of the first receiver based on the synchronization signal and a time interval between wakeups of the first receiver; and
negotiate a sniff start time with a wireless device based on the predicted wakeup time.

45. A non-transitory computer readable medium comprising instructions executable by a processing system in an electronic device, the instructions comprising code for:
receiving a synchronization signal indicating a wakeup time of a first receiver;
waking up a second receiver from a sleep state based on the synchronization signal to receive a wireless signal; and predicting a future wakeup time of the first receiver based on the synchronization signal and a time interval between wakeups of the first receiver.

46. The machine-readable medium of claim 45, further comprising instructions for:
    waking up the first receiver; and
    generating the synchronization signal.

47. The machine-readable medium of claim 45, wherein the first receiver is configured to receive a cellular signal.

48. The machine-readable medium of claim 45, wherein the wireless signal comprises a Bluetooth signal.

49. The machine-readable medium of claim 45, further comprising instructions for:
    waking up a processor from a second sleep state based on the synchronization signal to process a signal from the second receiver.

50. The machine-readable medium of claim 49, wherein the wireless signal comprises a Bluetooth signal.

51. The machine-readable medium of claim 45, further comprising instructions for:
    waking up the second receiver and a processor based on the synchronization signal to perform a page scan operation.

52. The machine-readable medium of claim 45, further comprising instructions for:
    waking up the second receiver and a processor based on the synchronization signal to perform an inquiry scan operation.

53. The machine-readable medium of claim 45, further comprising instructions for:
    waking up the second receiver and a processor based on the synchronization signal to perform a sniff mode operation.

54. The machine-readable medium of claim 45, further comprising instructions for:
    negotiating a sniff start time with a wireless device based on the synchronization signal.

55. The machine-readable medium of claim 45, further comprising instructions for:
    negotiating a sniff time interval with a wireless device based on the synchronization signal.

56. The machine-readable medium of claim 45, further comprising instructions for:
    negotiating a sniff start time with a wireless device based on the predicted wakeup time.

* * * * *